May 23, 1967 D. F. HASTINGS 3,321,132
MODULAR AIR DATA COMPUTER
Filed Sept. 29, 1965 4 Sheets-Sheet 1

INVENTOR.
DONALD F. HASTINGS
BY
Constantine A. Michalos
ATTORNEY

INVENTOR.
DONALD F. HASTINGS
BY
Constantine A. Michalos
ATTORNEY

INVENTOR.
DONALD F. HASTINGS
BY
Constantine A. Michalos
ATTORNEY

INVENTOR
DONALD F. HASTINGS
BY
Constantine A. Michalos
ATTORNEY

United States Patent Office 3,321,132
Patented May 23, 1967

3,321,132
MODULAR AIR DATA COMPUTER
Donald F. Hastings, Mahwah, N.J., assignor to The Bendix Corporation, a corporation of Delaware
Filed Sept. 29, 1965, Ser. No. 491,142
7 Claims. (Cl. 235—1)

The invention relates to a modular air data computer and more particularly to a novel construction to affect operative mechanical interconnections in a computer between input and output subassembly units.

The present day air data computer receives electrical and pneumatic signals, and combines these signals to provide a multiplicity of electrical outputs as required by the system for which the computer has been designed. Depending upon the system which uses the computer, any or all of the outputs may be required over different ranges, and may be connected to a multiplicity of output indicators or to the control means of the system.

An air data computer is a device which receives measurements of the conditions ambient to the aircraft in flight. The measured conditions usually include the three basic air flight variables: static pressure, total pressure, and total air temperature. The computer has input transducer subassembly units for converting the measured conditions into mechanical signals, and then by mechanical means such as cams, linkages, differentials, gears, or synchros, performs the necessary mechanical and/or electrical computations to provide the multiplicity of output signals such as Mach number, air density, true air speed of the aircraft and true angle of attack.

Formerly, the several input transducers were operatively connected to the balance of the air data computer by an orderly but arbitrary arrangement of motion or signal transmitting means, that often included shafts, bevel gears, or spur gears, differential gears, and direct coupling. At such a time, when it became necessary to rebuild or expand an already existing air data computer, as heretofore constructed, there was encountered great difficulties because there was not sufficient volume for, and the physical layout did not permit, the addition or substitution of new air data computer parts or subassemblies.

The very nature of an air data computer demands a small volume and attendant high density of the package. In all high density equipment, repair and isolation of malfunctioning parts is a complicated procedure.

The modular construction of the air data computer of the present invention eliminates these problems with a small increase in volume. In one arrangement, heretofore conceived for an electromechanical air data computer, there was a single electrical output for each one of all required output parameters. The computer was coupled electrically to a converter with one package for each of the parameters, as required by the aircraft. Each converter had a re-servoing mechanism to drive the various output devices. The obvious disadvantages of such a system were twofold: the computer usually had several unused output channels; and, because each desired output parameter was reservoed by the aforesaid mechanism, the computer was of excessive weight and size.

In another arrangement, the air data computer received certain specified inputs and provided only specified outputs. The various parts of the computer were connectable to each other to facilitate the initial manufacture, testing, and repair. The disadvantages of such a system are that once the inputs and outputs have been specified, it becomes impossible to add or make substitutions among the inputs or outputs.

The present invention provides means for a modular construction of an air data computer. As before, the measurements of the ambient conditions are applied to input transducers; but in the invention, the parts that comprise the subassembly of each input transducer are physically confined to an individual compartment which is of a basic size, physically separable from the other subassemblies, and connectable into the air data computer. Likewise, all of the equipment required for computing and providing each of the many output signals is segregated into functional subassemblies which are each packaged in separate and individual modular containers that are also connectable into the computer.

A feature of the modular air data computer of the present invention is the provision of novel means by which the input and output subassembly units are joined to each other through a common transmitting means for operatively linking the input modules to the output modules; thus, not only organizing the modules in a compact and systematic arrangement and providing for an interchangeability of modules for repair and testing; but, also providing for substitution of redesigned modules for old modules, and the substitution of modules that perform different functions for old modules, and the addition of new modules for expanding the existing air data computer. In fact, the air data computer may be expanded, as to some small detail; or, as to complete subassemblies while retaining portions of the old air data computer, thereby permitting a great economy of equipment, a rapid changeover, and an attendant great saving in the amount of labor required for the changeover.

An air data computer constructed in accordance with this invention may be useful in the development stage of an aircraft. As the aircraft goes through different stages of development, the air data computer may be required to receive different inputs and to provide different outputs. In an air data computer, constructed in accordance with this invention, the new requirements can be easily satisfied by the substitution of redesigned input modules and redesigned output modules for the original ones.

The present invention also envisions a means for constructing a universal air data computer that is applicable for any type of aircraft. The universal air data computer comprises a module joining means and an assortment of modules. Different combinations of modules are plugged into the module joining means depending upon the type of craft in which it is installed.

Therefore, an object of this invention is to provide means for segregating the functional part of an air data computer into separate subassembly units, each housed in separate compartments, and means for operatively interconnecting the several units.

Another object of this invention is to provide an air data computer using semistandard interchangeable assemblies thus permitting simplicity of initial construction, repair, and testing.

Another object of this invention is to provide an air data computer that can be easily reconstructed and expanded.

Anoher object of this invention is to provide an improved modular construction for an air data computer.

Another object of this invention is to provide a universal air data computer for use in all types of aircraft.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
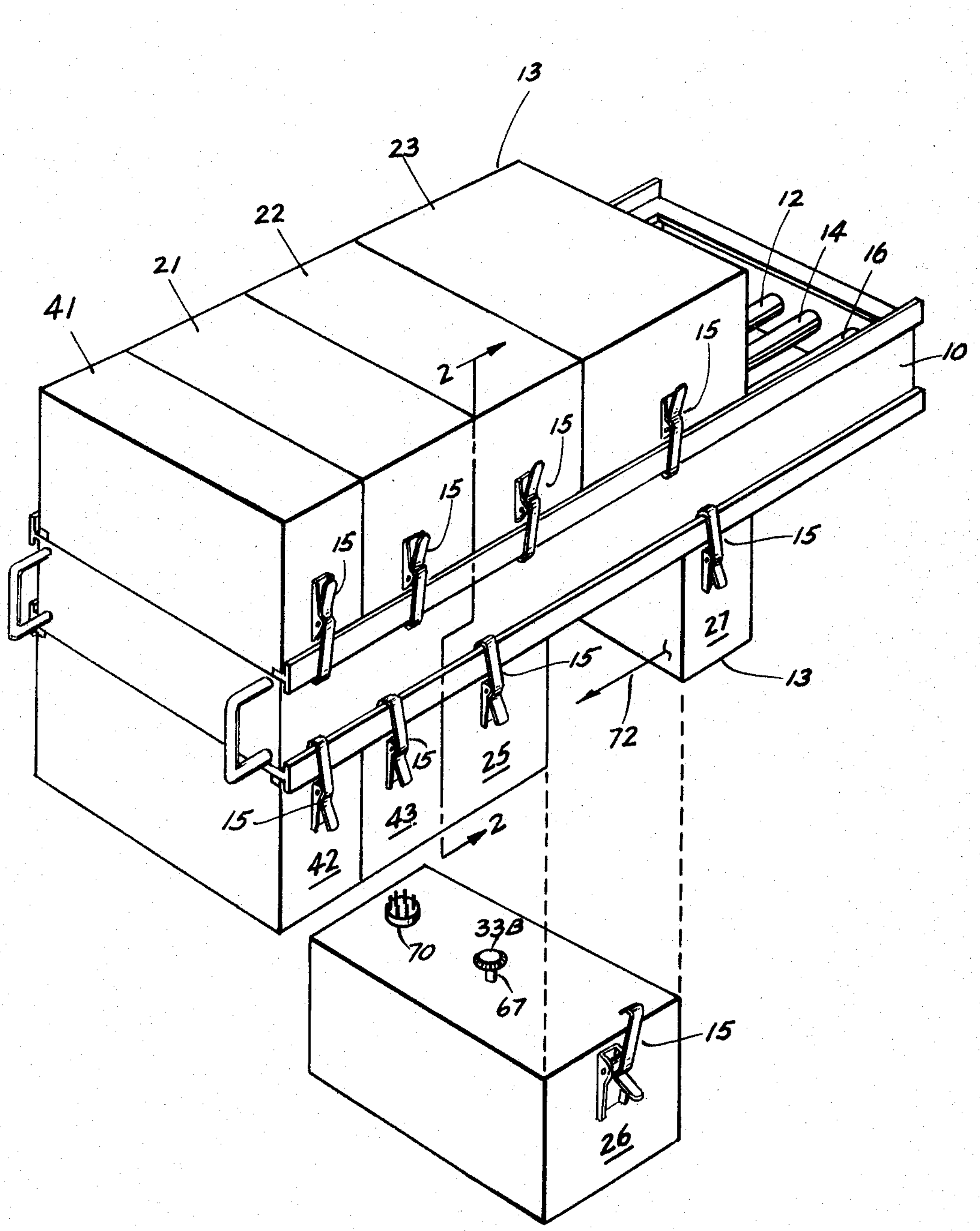
FIGURE 1 is a perspective view showing a form of a modular type air data computer constructed in accordance with this invention.

Referring to all the figures of the drawings in detail, the embodiment of this invention provides for a rack or frame 10 on which is longitudinally mounted three shafts 12, 14 and 16. Supported on these three shafts 12, 14 and 16 are a plurality of longitudinally movable bevel gears 18A to 18F, 19A to 19D, and 20A to 20D, respectively. Output modules 21 to 30 and input modules 41, 42 and 43 are removably supported by off-center guide disconnect clamps 15 to both sides of the frame 10 and drive or are driven by interconnecting shafts, differentials and the three main shafts 12, 14 and 16 through bevel gears 32A to 32F, 33A to 33D and 34A to 34D.

It should be noted that the bevel gears herein described may be coupled to one or more of the three shafts as desired. That is, as can be seen, the modules may have one to three projecting shafts carrying bevel gears. The projected shafts of the modules may be placed so as to mesh with the bevel gears of the three shafts which are located longitudinally on said three shafts. That is, the three shafts 12, 14 and 16 carried by the frame 10 may support the bevel gears 18A to 18F, 19A to 19D, and 20A to 20D in any desired predetermined position along the frame since these bevel gears are longitudinally adjustable on the three shafts. For example, bevel gear 20B can be shifted to any specific position along the shaft 16 by loosening a clamp 44, longitudinally moving the clamp 44 with the gear 20B to another location on the shaft 16 and again tightening the clamp 44 in this new location.

The module structures are made of the same height above the frame and the same width extending transversely of the frame. As noted in FIGURE 1, the modules may have any designed length extending along the longitudinal axis of the frame 10 parallel to the shafts 12, 14 and 16 axes. Thus, the modules, regardless of their lengths, can be assembled in contact with each other and yet coupled properly with the frame shafts.

Figure 2:
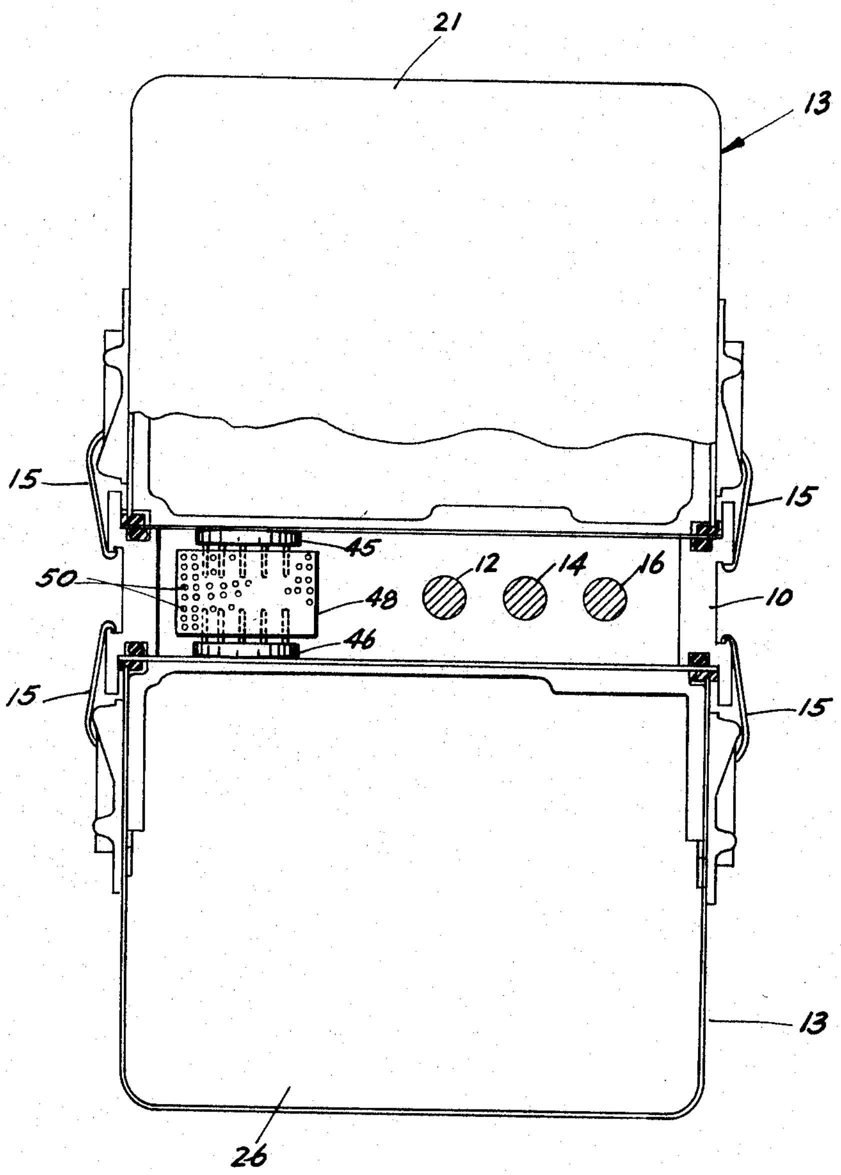
FIGURE 2 is a cutaway partial sectional view taken along lines 2—2 of FIGURE 1 and looking in the direction of the arrows.
Figure 3:
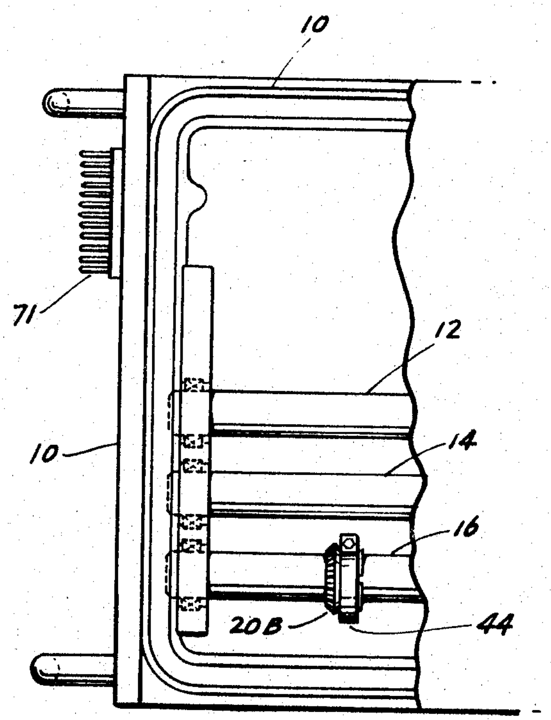
FIGURE 3 is a fragmentary top plan view of FIGURE 1 with the upper tier of compartments removed; and, FIGURE 4 is a schematic drawing of an air data computer constructed in accordance with this invention.
Figure 4:
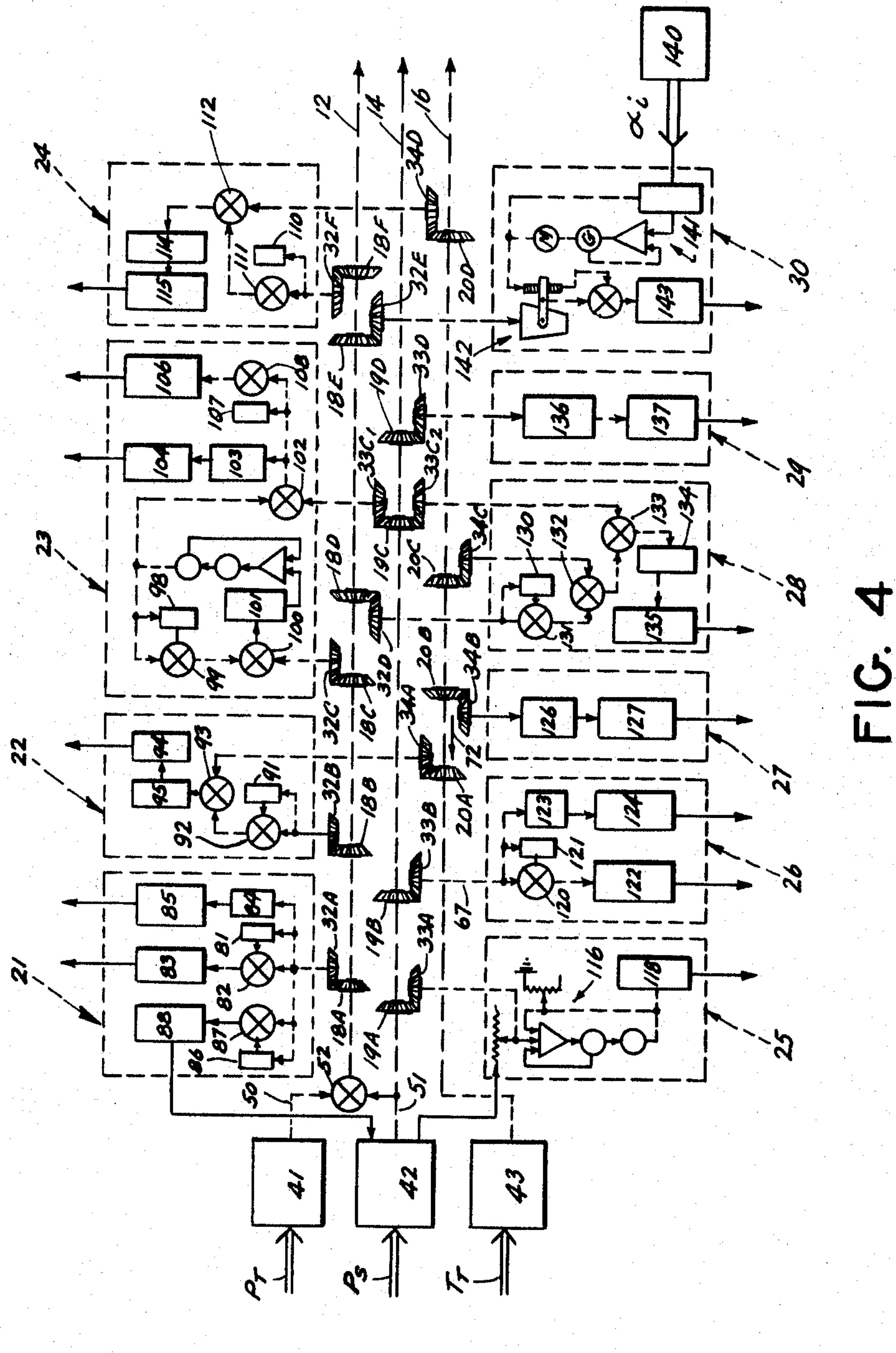

FIGURE 2 shows the means by which the modules 21 to 30, containing the various parameters, can be coupled to the frame shafts 12, 14 and 16, and FIGURE 4 shows the means to pick up signals from one or more parameters. For instance, module 28, as shown in FIGURE 4, necessitates the use of three separate gears 32D, 33$C_2$ and 34C to pick up data from three separate parameters. That is, the bevel gear 32D picks up the log of the total pressure parameter sensed by the device 41 over the log of the static pressure parameter sensed by the device 42 or $P_T/P_S$; the bevel gear 33$C_2$ picks up the log of the static pressure parameter sensed by the device 42 or $P_s$; and the bevel gear 34C picks up the log of the total temperature parameter sensed by the device 43 or $P_T$.

Structurally, each module has at least one shaft terminating in a bevel gear which meshes with a bevel gear on one of the main shafts 12, 14 and 16, and in addition each module is provided with electrical plugs such as plugs 45 and 46, shown in FIGURE 2, which connect into a main electrical receptacle system 48 having a plurality of conductors 50 through which are transferred the prerequisite output and input module signals.

FIGURE 2 shows the basic height and width of each module enclosed in containers 13 which are securely fastened or clamped on to the frame 10 by the off-center quick disconnect clamps 15.

As illustrated in FIGURE 4 of the drawing, the three main shafts 12, 14 and 16 rotate proportionally to three input functions. More specifically, the total pressure $P_T$ is directed into a device 41 for producing the log total pressure parameter, the static total pressure $P_s$ is directed into a device 42 for producing the log static pressure parameter and the total temperature $T_T$ is directed into the device 43 for producing the log total temperature parameter. In detail, the log total pressure parameter device 41, log $P_T$, is linked with the log static pressure parameter device 42, log $P_s$, by shafts 50 and 51 and the differential 52 to produce a log of the total pressure parameter over the static pressure parameter or log $P_T/P_s$ which in turn is connected to the first shaft 12.

It should be noted that by computation methods, well known in the art, using mechanical elements such as cams, differentials, and gear trains, these three shafts 12, 14 and 16 can drive modules deriving any of the normally required air data output parameters.

FIGURE 4 shows schematically a computer built up on the module system herein described. Ten output modules 21 to 30 and three input modules 41, 42 and 43 are shown but, it should be understood, that for any specified aircraft, some of these modules might be omitted or others might be added.

A brief description of the operation of each module, shown in FIGURE 4, is as follows:

The module 21 is a module for determining the Mach number M. This module is driven only by the log $P_T/P_S$ through the shaft 12 by gears 18A and 32A. A cam 81 and a differential 82 converts the log $P_T/P_S$ to Mach for Mach outputs 83. Log $P_T/P_S$ outputs 85 may be driven directly through a magnetic clutch 84. If position error correction as a function of Mach is required, a cam 86 and differential 87 drives a potentiometer output which is proportional to the log $P_{si}/P_s$ outputs 88 where $P_{si}$ is the indicated static pressure. This is fed electrically to the $P_s$ sensor to correct the sensed $P_{si}$ to log $P_s$.

The module 22 is a module for determining the true air speed $V_T$. This module accepts inputs of log $P_T/P_S$ through the shaft 12 by gears 18B and 32B and log $T_T$ through the shaft 16 by gears 20A and 34A. A cam 91 and a differential 92 converts log $P_T/P_S$ to log $$M/\sqrt{1+.2KM^2}$$

This function, added by a differential 93 to log $T_T^{1/2}$, will result in a shaft position proportional to log $V_T$ 94 which has been delogged by antilog gears 95.

The module 23 is a module for impact pressure $Q_c$ and indicated air speed $V_c$. This module is coupled to the log $P_T/P_S$ through shaft 12 by gears 18C and 32C and the log $P_s$ through shaft 14 by gears 19C and 33$C_1$. Log $P_T/P_S$ is converted to log $Q_c/P_s$ by a cam 98 and differential 99 and 100. A booster servo 101 is used to increase the available output torque and improve accuracy. Log $P_s$ is added to log $Q_c/P_s$ by a differential 102 resulting in log $Q_c$. Antilog gears 103 are used if $Q_c$ outputs 104 are specified. If $V_c$ outputs 106 are required, a cam 107 and a differential 108 are provided to convert log $Q_c$ to $V_c$ outputs 106.

The module 24 is a free air or static temperature module $T_s$. This module accepts inputs of log $T_T$ through shaft 16 by gears 20D and 34D and log $P_T/P_s$ through shaft 12 by gears 18F and 32F. Log $T_s$ is derived through a cam 110 and differentials 111 which converts log $P_T/P_s$ to log $(1+.2KM^2)$. A differential 112 subtracts this function from log $T_T$ and then it is delogged by antilog gears 114 to produce $T_s$ outputs 115.

The module 25 is the altitude rate module $H_{pr}$. This module is mechanically coupled to the log $P_s$ through shaft 14 by gears 19A and 33A and also accepts a voltage output from a rate generator 116 in the log $P_s$ sensor. This voltage is proportional to the log $P_s$ rate. It is corrected to altitude rate $H_{pr}$ 118 by a potentiometer driven by log $P_s$ through shaft 14. The resulting voltage is fed to a servo to produce a shaft position proportional to the altitude rate $H_{pr}$ 118 which then drives specified outputs.

The module 26 is an altitude $H_p$ module. This module is coupled to the log $P_s$ through shaft 14 by gears 19B and 33B. A differential 120 and cam 121 converts log $P_s$ to $H_p$ outputs 122. A magnetic clutch 123 couples an altitude hold output directly to the log $P_s$ shaft 14.

The module 27 is a total temperature module $T_T$. This module is coupled to the log $T_T$ through shaft 16 by gears 20B and 34B. Antilog gear 126 is used to derive the $T_T$ outputs 127.

The module 28 is a density ratio module $\rho/\rho_0$. As hereinbefore described, this module accepts inputs from all three shafts. Shaft 12 supplies the log $P_T/P_s$ by gears 18D and 32D, the shaft 16 supplies the log $T_T$ by gears 20C and 34C, and shaft 14 supplies log $P_s$ by gears 19C and 32C$_2$. A cam 130 and a differential 131 converts log $P_T/P_s$ to log $(1+.2KM^2)$ a differential 132 subtracts this function from log $T_T$ resulting in the log of the true air temperature log $T_s$. Another differential 133 subtracts the log $T_s$ from log $P_s$ producing log P. Antilog gears 134 are then used to drive density ratio outputs $\rho/\rho_0$ 135.

The module 29 is a static pressure module $T_s$. This module couples only to the log $P_s$ through shaft 14 by gears 19D and 33D. Antilog gears 136 are used to produce static pressure output $P_s$ 137.

The module 30 is a true angle of attack module $\alpha_T$. This module accepts inputs from the log $P_T/P_s$ through shaft 12 by gears 18E and 32E and electrically accepts inputs from an angle of attack sensor $\alpha_i$ 140. The electrical signal $\alpha_i$ is servoed by servo 141 and fed into a 3 dimensional cam 142 together with a shaft position proportional to log $P_T/P_s$ to produce the $\alpha_T$ output 143.

It can be seen that the minimum design volume of any one of these modules will be affected by the number and type of outputs specified in each. However, the basic design will remain the same, and a computer made up of larger modules will only require a larger rack. Excess length can also be provided in the rack to allow for future changes or expansion of the computer.

As shown in FIGURE 1, the device may be comprised of six ouptut modules such as the modules 21, 22, 23, 25, 26 and 27, plus input modules 41, 42 and 43. In FIGURE 1, module 26 has been removed from the frame 10. This can be done by disengaging its bevel gear 33B, which is attached to a shaft 67, from bevel gear 19B which is attached to shaft 14. In addition, its plug 70 can be disconnected from the main electrical receptacle system 48 without effecting any other module.

The bevel gear 20B on shaft 16 can then be moved longitudinally along the shaft 16 by loosening clamp 44. The gear 20B will be relocated on the shaft 16 and clamped by the clamp 44 so that the module 27 can be moved in a direction shown by arrow 72 of FIGURE 1 adjacent to the module 25 so that the gear 34B of the module 27 will engage the relocated gear 20B. In this manner, the module 27 can be adjacent to module 25 to present thereby a somewhat smaller packaged device.

It should be noted that outputs of each module may vary and be comprised of a various combination of synchros, potentiometers and switches. The only prerequisite that may be required is that if a large number of outputs are required for any specific module and there is insufficient torque within the shafts to drive these outputs reservoing may be required within the module.

In addition, it can be seen that the minimum design volume of any one of these modules will be effected by the number and type of outputs specified in each. However, the basic structure will remain the same and a computer made of larger modules will only require a larger frame. Also excess length can be provided in the frame to allow for future changes or expansion of the computer.

Although only one embodiment of this invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An air data computer of modular construction comprising a frame, shafts rotatably mounted on said frame, gears mounted on said shafts and adjustable longitudinally along said shafts, modules mounted on said frame having output means operably engaging the gears of said shafts, and fastening means for rigidly holding the module to the frame at any position along the length of said frame.

2. A modular air data computer comprising a plurality of modular subassemblies having substantially the same height and width and having shaft and gear means extending therefrom, a frame supporting said modules, a plurality of shafts supported by said frame, each shaft rotatable in accordance to a predetermined measured parameter, each of said shafts having positioned thereon adjustable gears for connecting to said gear means of said modules depending on their number and their location along said frame.

3. A modular construction for air data computers responsive to a plurality of basic air flight variable condition responsive means comprising a rigid frame, a plurality of longitudinal shafts rotatable in said frame, each shaft operably driven by a basic air flight variable condition responsive means, a plurality of gears adjustably mounted on each shaft, modules rigidly mounted on the frame having output means operably engaging the gears on said shafts and being driven by said shafts depending on the measured parameter received.

4. An air data computer comprising input and output modules, a frame securely holding said input and output modules, a plurality of shafts supported by said frame, gears mounted on said shafts operably positioned along the lengths of said shafts, and shafts and gears extending from said input and output module and so positioned as to be able to engage the gears of said shafts.

5. An air data computer comprising a frame, a plurality of shafts supported by said frame, a plurality of functional subassembly units which are packaged in separate and individual module containers, each of said modules having an electrical connecting means operably interconnecting the computer, a plurality of clamping means for rigidly clamping said modules on to said frame, a plurality of engaging means adjustably mounted on said shafts and a second plurality of engaging means operably connected from said modules to said frame.

6. A computer of modular construction comprising a rigid frame, shafts supported on said frame, engaging means mounting on said shafts and adjustable along the lengths of said shafts, input modules mounted on said frame with output means operably engaging said engaging means on said shaft for driving the shaft of said frame, output modules operably mounted on said frame with input means operably engaging the engaging means of said shafts and being driven by the shafts supported on said frame and fastening means for rigidly holding the input and output modules to said frame at any predetermined position along the length of said frame.

7. A mechanical interconnection for an air data computer comprising a frame, shafts rotatably mounted on said frame, a plurality of gears adjustably positioned longitudinally along each of said shafts and including means to fixedly attach said gears thereto, basic air flight variable condition responsive means including an output shaft and gear rotatable in accordance with an air flight condition sensed by the air flight variable condition responsive means, each air flight variable condition responsive means to operably rotate one of said shafts in response to a change in the sensed condition, a plurality of flight modules having uniform height and depth including shafts terminating in a bevel gear, said shafts and gears being rotated in accordance with the output shaft and gear of the air flight variable condition responsive means, said modules being operably connected on to said frame, the gears on the frame shafts and the modules being positioned with respect to each other so as to mesh, and fastening means for securing said modules on to said frame upon said modules being properly adjusted on said frame.

References Cited by the Examiner

UNITED STATES PATENTS

| | | | |
|---|---|---|---|
| 2,203,109 | 6/1940 | Slye | 235—144 |
| 2,274,115 | 2/1942 | Wild | 235—144 |

RICHARD B. WILKINSON, *Primary Examiner*

S. A. WAL, *Assistant Examiner.*